Dec. 19, 1967 A. ALBRECHT ET AL 3,359,522

CONTACT-FREE ROTARY RESISTOR ARRANGEMENT

Filed Sept. 30, 1965 4 Sheets-Sheet 1

Dec. 19, 1967 A. ALBRECHT ET AL 3,359,522

CONTACT-FREE ROTARY RESISTOR ARRANGEMENT

Filed Sept. 30, 1965 4 Sheets-Sheet 2

Dec. 19, 1967 A. ALBRECHT ET AL 3,359,522
CONTACT-FREE ROTARY RESISTOR ARRANGEMENT
Filed Sept. 30, 1965 4 Sheets-Sheet 3
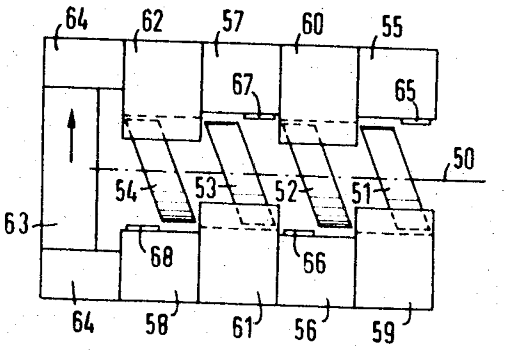
Fig. 12
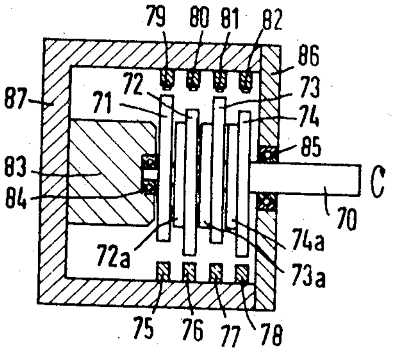
Fig. 13
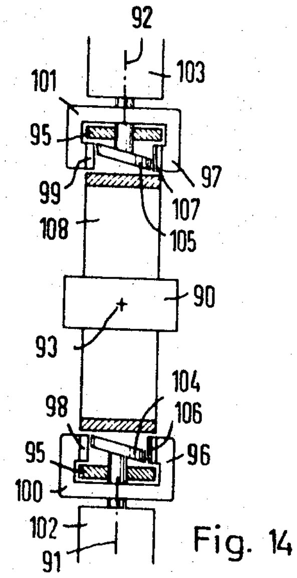
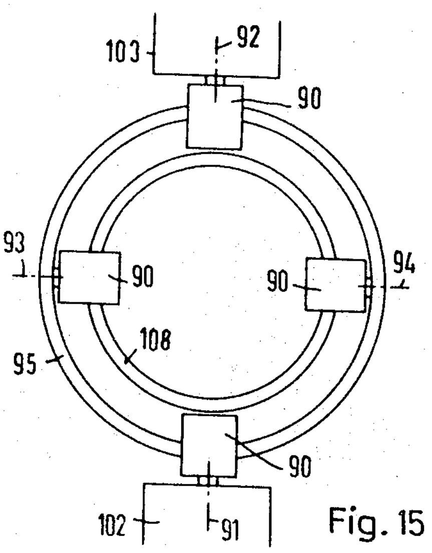
Fig. 14, Fig. 15

United States Patent Office 3,359,522
Patented Dec. 19, 1967

3,359,522

CONTACT-FREE ROTARY RESISTOR ARRANGEMENT

Adolf Albrecht and Paul Hini, Erlangen, Germany, assignors to Siemens-Schuckertwerke Aktiengesellschaft, Berlin-Siemensstadt and Erlangen, Germany, a corporation of Germany Filed Sept. 30, 1965, Ser. No. 491,687
Claims priority, application Germany, Oct. 3, 1964, S 93,611, S 93,612
8 Claims. (Cl. 338—32)

ABSTRACT OF THE DISCLOSURE

Contact-free rotary resistor arrangement comprises a magnetic circuit including a stationary magnetically excited structure, and a disc-shaped magnetic structure disposed adjacent and peripherally spaced from the stationary structure so as to define an air gap therebetween. The disc-shaped structure has a rotary axis and at least one end face thereof slanted with respect to the axis, and the stationary magnetically excited structure and the rotary disc-shaped structure have peripheral surfaces at least partly opposing one another. The air gap is traversible by the pheripheral surface of the disc-shaped structure during each cycle of rotation of the disc shaped structure about its axis so as to produce a varying magnetic field in the air gap, at least one galvanomagnetic semiconductor field plate is disposed on one of the opposing peripheral surfaces so as to be subjected to the varying magnetic field in the air gap during the rotation cycle. Means are also provided for connecting the field plate in an electrical circuit.

Our invention relates to rotary resistors and potentiometers. More particularly, it relates to arrangements comprising galvanomagnetic semiconductor field plates which are suitable for use as contact-free variable rotary resistors, and as contact-free potentiometers.

It has become known to dispose galvanomagnetic semiconductor field plates in the air gap defined by the opposing faces of magnetically excited pole shoes whereby the field plates display galvanomagnetic resistance characteristics, the resistance varying directly with the amount of the area of the field plate disposed in the magnetic circuit. Thus, contact-free variable resistors and potentiometers can result from such arrangement, the variability being effected by the degree of insertion of the field plate in the magnetic circuit or the variation of the magnetic field. To provide a rotary resistor such as a rheostat, a pair of electric terminals are provided on each end of the field plate respectively. To provide the the potentiometer, it is merely necessary to provide a third electrical terminal intermediate the end terminals on the field plate. The electrical resistance of the field plate attains a maximum value when the field plate is disposed entirely within the magnetic field and may be smoothly diminished to a minimum value by correspondingly smoothly removing the field plate from the influence of the magnetic field until it is disposed externally thereto.

It is an object of this invention to provide a rotary resistor arrangement utilizing the galvanomagnetic resistance characteristic of semiconductor field plates which enable the producing of chosen resistance characteristics with respect to angle of rotation.

It is an other object to provide a position indicator for a cardanic suspension employing rotary resistor arrangements constructed in accordance with the preceding object.

These objects are attained by providing a contact-free rotary resistor arrangement having galvanomagnetic semiconductor field plates in the air gap defined by the faces of a pair of magnetically excited pole shoes in a magnetic circuit. The magnetic circuit comprises stationary structures and rotary structures whch are rotatable about an axis of rotation relative to the stationary parts. The opposing pole faces, separated from each other by an air gap, are so designed whereby, upon the rotation of a rotary part, i.e., rotary pole shoe, of the magnetic circuit, the pole face of the latter is shifted parallel to the plane of a field plate which is disposed on the opposing pole face. The width of the air gap at its narrowest point is chosen to be approximately equal to the thickness of a field plate whereby the pole shoes are prevented from making physical contact with each other.

In the description hereinbelow, the term "width of the air gap" signifies the distance between associated pole shoes. The term "longitudinal direction" of the field plate is the direction in which current flows through the field plate during its operation in an electrical circuit. The term "width" of the field plate means the magnitude of the dimension of the field plate which lies perpendicular to the aforesaid longitudinal direction, in the plane of the field plate.

The portions of the magnetic circuit which are rotatable about an axis of rotation are referred to hereinbelow as magnetic yokes. These magnetic yokes may suitably be comprised of solid or lamellar soft, i.e., high permeability, magnetic material or may be comprised of ferrite. It is also preferable to produce the pole shoes of the spatially stationary parts of the magnetic circuit of such soft magnetic material, these pole shoes being generally continually excited. Such latter continuous excitation results in an adjustment of the direction of the magnetic flux in these stationary pole shoes to the momentary position of the rotary portion of the magnetic circuit, i.e., the narrowest point of the air gap, if the latter position shifts relative to the statonary pole shoes affixed in the stationary part of the magnetic circuit, upon the rotation of the rotatable part, i.e., the yoke.

Generally speaking and in accordance with the invention, there is provided a contact-free rotary resistor arrangement. The arrangement comprises a magnetic circuit which comprises a magnetically excited stationary structure and a rotary portion comprising a magnetic structure disposed adjacent and peripherally spaced from the stationary structure to define an air gap between the stationary and the magnetic structures. The rotatable structure is adapted to be rotated about an axis of rotation whereby it traverses the defined air gap in each cycle of rotation. At least one galvanomagnetic semiconductor field plate is disposed on one of the opposing faces of the structures defining the air gap, the peripheral configurations of the faces being so chosen whereby the field plate is subjected to a varying magnetic field during the rotation cycle, the field plate being adapted to be connected in an electrical circuit.

The above-mentioned and more specific objects and features of our invention will be apparent from, and will be mentioned in the following description of contact-free rotary resistor arrangements according to the invention shown by way of example in the accompanying drawing. The scope of the invention is pointed out in the appended claims.

In the drawing, FIG. 1 is a depiction, partly three-dimensional and partly in section of an illustrative embodiment of a contact-free rotary resistor arrangement of a first group type constructed in accordance with the principles of the invention;

FIG. 12 is a schematic depiction of a cascade resistor combination, constructed in accordance with the principles of the invention, and comprising first group type rotary resistor arrangements;

FIG. 13 is a depiction, partly in section, of a cascade resistor combination, constructed in accordance with the principles of the invention, and comprising second group type rotary resistor arrangements;

FIG. 14 is a side view, partly in section, of a position indicator comprising first group type rotary resistor arrangements, for a cardanic suspension;

FIG. 15 is a plan view of the position indicator shown in FIG. 14;

Figure 1:
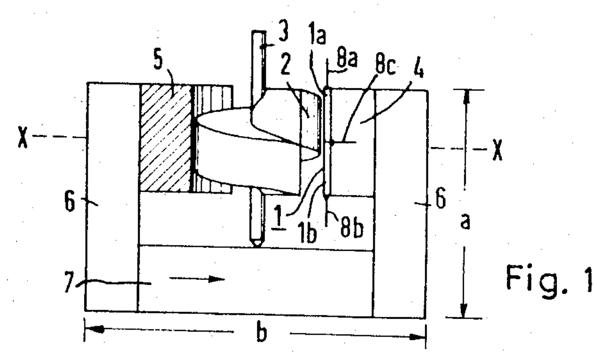

The rotary contact-free resistors constructed in accordance with the principles of the invention may suitably be divided into two groups.

The first of these groups comprises those rotary resistors in which a magnetic material yoke is arranged to be rotatable about an axis of rotation which lies perpendicular to the direction of the magnetic lines of force. Such yoke is received into the substantially cylindrical space defined between the pole faces of spaced stationary structures which together with the yoke form the magnetic circuit. Galvanomagnetic semiconductor field plate means are disposed on one of the aforesaid pole faces whereby the magnetic yoke passes across the surface of the field plate as it is rotated and whereby the field plate is located in the magnetic circuit. With such arrangement, the yoke, which can be rotated as much as is desired and which upon its rotation, progressively moves across the surface of the field plate in the axial direction (along the longer dimension of the field plate) is always in a stable mechanical and stable magnetic state.

The yoke in these first group rotary resistor arrangements may be of a worm shape, for example, with a spiral winding whose outer peripheral edge or side (the edge having some thickness) lies parallel or concentric with the inner surface of the cylindrical space defined by the pole shoes in the magnetic circuit. The worm-shaped yoke may conveniently be described as having the shape of the known spring washer which serves as a supporting disc for screws. Upon rotation of the yoke and consequently the worm, the peripheral side of the worm effectively is unwound to move across the field plate along the axial direction. If, for example, a two-terminal field plate, i.e. one having an electrical terminal at each end with respect to its longitudinal axis is disposed on one of the aforesaid pole shoes of the stationary portion of the magnetic circuit, then with a worm having an appropriate pitch and peripheral thickness, dependent upon the rotary angle, a predetermined linear, parabolic or exponential resistance characteristic of the rotary resistor arrangement may be obtained.

If the galvonomagnetic semiconductor field plate is of the two-terminal type, then the peripheral edge or side of the yoke in a rotary resistor of the first group is selected to have a thickness equal to the length of the field plate. The field plate may also be chosen to be of the three terminal type, i.e., as a potentiometer, in which case it has both its two respective and electrical terminals and a centrally located electrical terminal. Where the field plate is arranged to function as a potentiometer, a yoke is chosen whose peripheral side or edge has a thickness equal to one-half the length of the field plate.

In rotary resistor arrangements, particularly of this first group, in order to reduce and minimize stray magnetic flux which may occur in the direction of the axis of rotation of the yoke, the lateral cross sectional configuration of the pole shoe carrying the galvanomagnetic semiconductor field plate may be configured whereby its inner longitudinal sides are concave with respect to the passage of the magnetic lines of force in the magnetic circuit. The pole shoe carrying the field plate may suitably be chosen to be "bridge" shaped, i.e., it bridges the space defined between the pole shoes. The cross section of such type of bridge-shaped pole shoe converges concavely toward a flat apical portion thereof upon which the field plate is disposed, the flat portion being substantially coextensive in length and width with that of the field plate, the annular air gap defined by the outer periphery of the yoke and the opposing surface of the field plate being made as narrow as is possible.

Further, to reduce or minimize this stray magnetic flux, the cross-section of the other pole shoe not carrying the field plate, in the stationary portion of the magnetic circuit of the first group type rotary resistor may suitably be configured to be that of a semicircle. Thus, this type of pole shoe configuration is that of about one half of a longitudinally sectioned hollow cylinder, and is suitably described as being semi-cylindrical. The configuration of the latter pole shoe results in the fact that the axis of the yoke is subjected to substantially no torque. As the yoke is preferably mechanically balanced, no mechanical recoils occur therein.

In the simplest arrangement, the magnetic circuit in the above-described rotary resistor arrangements is excited by a permanent magnet. When the latter type magnet is employed, it is to be noted that, if stray magnetic losses are neglected, the flux $B_1F_1$ through the permanent magnet and the flux $B_2F_2$ through the aforesaid flat apical portion upon which the field plate is disposed, are equal. The flux density $B_1$ in the magnet having the cross sectional area $F_1$ and the flux density $B_2$ through the apical plateau area $F_2$ are inversely proportioned in relation to the above mentioned areas respectively. Since the area $F_2$, which is also essentially the area of the field plate face, is relatively small as compared to area $F_1$, the exciting permanent magnet need only be sufficiently strong to just about maintain the pole shoes (with the field plate thereon) in a saturated state.

Referring now to FIG. 1, there is shown therein a view, partly three-dimensional and partly in cross section of an illustrative embodiment of a first-group type rotary resistor, i.e., one in which a magnetic yoke is rotatable around an axis which lies perpendicular to the magnetic lines of force, the embodiment shown in FIG. 1 comprising a worm-shaped yoke. Such worm-shaped yoke 2, which is comprised of a soft, i.e., high-permeability magnetic material, is arranged to be rotatable by its mounting on an axially disposed rotatable member 3, and is disposed in the gap between the magnetically excited pole shoes of the fixed or stationary portion of the magnetic circuit. Axially aligned member 3 is disposed perpendicularly to the magnetic lines of force between pole shoes 4 and 5. The numeral 1 designates a galvanomagnetic semiconductor field plate having three electric terminals, viz., end terminals 8*a* and 8*b* and an intermediate terminal 8*c*, field plate 1 being disposed on pole shoe 4 which is constructed to bridge the longitudinal diametric face of semicylindrical pole shoe 5. Since terminal 8*c* is located at the midpoint of the ends of field plate 1, for convenience, field plate 1 may be described as comprising the two halves 1*a* and 1*b*. The structure 7 is the magnetic cross-piece of the U-shaped magnet which excites pole shoes 4 and 5, structures 6 being the legs of the magnet. The arrow shown in structure 7 indicates the direction of the magnetic path. Pole shoes 4 and 5 suitably comprise a soft, i.e., high permeability, magnetic material and legs 6 preferably comprise a particularly soft magnetic material. The dimensions of yoke 2 are so chosen whereby its outer peripheral side surface is accommodated in the gap defined by pole shoes 4 and 5 with a minimal air gap between such surface and the inner faces of pole shoes 3 and 4 and field plate 1.

Upon the rotation of axial member 3 and, consequently, yoke 2, the side peripheral surface of yoke 2 passes across field plate 1. Thus, if it is assumed that just prior to its rotation, yoke 2 was so disposed whereby part 1*a* of field plate 1 was traversed by a strong magnetic field because yoke 2 was disposed directly opposite thereto, then upon the rotation of yoke 2 in an appropriate direction, the peripheral side of yoke 2 moves across field plate 1, a point being arrived at during its rotation at the end of a cycle where it is directly opposite to part 1*b* of field plate 1. It is, of course, realized that field plate 1 has a length which is about twice the thickness of yoke 2.

Figure 2:
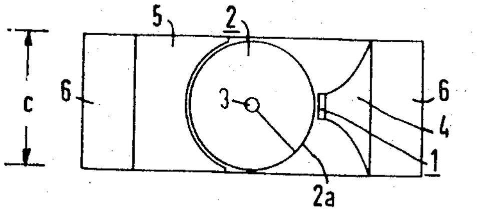
FIG. 2 is a section taken along lines X—X of FIG. 1.

In FIG. 2 wherein there is shown a view taken along the lines X—X of FIG. 1, it is seen therein that field plate 1 is firmly positioned on bridging pole shoe 4, pole shoe having sloping sides which are concave with respect to the main portion of the magnetic circuit. The profile of field plate 1 as well as the surface of pole shoe 4 on which plate 1 is disposed may suitably be chosen to be a circular segment concentric with the circle 2*a* which is defined by the periphery of yoke 2 to enable as great a reduction as is possible of the gap between yoke 2 and field plate 1. The lengths *a*, *b*, and *c* shown in FIGS. 1 and 2 may suitably be, in one design example, 26, 33 and 15 mm. respectively.

Figure 3:
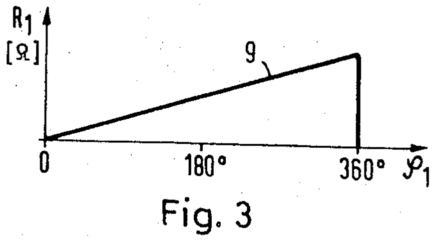
FIG. 3 is a graph illustrating the angle of rotation dependence of the resistance characteristic of the embodiment shown in FIG. 1.

In FIG. 3, there is shown a graph in which the abscissa is rotary angle $\varphi_1$, of the worm-shaped yoke according to FIGS. 1 and 2 and $R_1$ is the resistance in ohms of a two terminal galvanomagnetic semi-conductor field plate. With this type of yoke, i.e., one in which the outer side periphery is shifted upon rotation for exactly the axial height of one pitch, then the resulting characteristic line 9 increases linearly between the rotary angles of 0 and 360° for a two terminal field plate (which is of course different from the three terminal field plate 1 of FIGS. 1 and 2). Such rotary angle resistance dependency characteristic may also be made to be exponential if a worm is employed which has an appropriate non-linear shape.

From the embodiment described hereinabove, it is seen that a two-terminal field plate has a length substantially equal to the thickness of the side of the worm-shaped yoke. Consequently, such field plate has half of the length of the bridging pole shoe upon which it is disposed.

Figure 4:
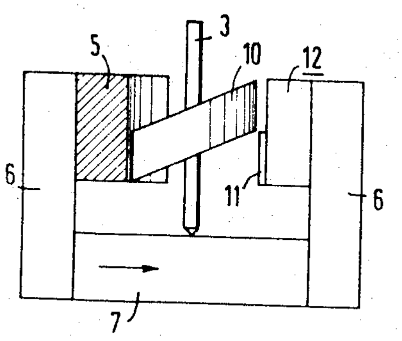
FIG. 4 is a depiction, partly in section, of another embodiment of a first group type rotary resistor arrangement.

In FIG. 4, there is shown another embodiment of a contact-free rotary resistor of the first group, according to the invention in which a yoke 10 is arranged to be rotatable by its mounting on axial member 3 and is disposed in the space defined by pole shoes 5 and 12. Yoke 10 is constructed in the form of a substantially circular slanted disc whose diametric dimension is disposed on a slant to the disposition of axial member 3, substantially as shown. The arrangement of FIG. 4 relates to an embodiment in which a two-terminal galvanomagnetic semiconductor field plate 11 (terminals not shown) has a length which is approximately equal to the thickness of disc 10 as contrasted with the embodiment depicted in FIG. 1 wherein the length of field plate 1 therein is approximately twice that of the peripheral side of worm 2. The last mentioned lengths and widths respectively are, of course, measured along the direction of the axis of rotation. Pole shoe 12 has a length about twice the length of field plate 11 and otherwise is constructed to have a configuration substantially similar to pole shoe 4 in the arrangement of FIG. 1. Particularly in the case of a rotary resistor arrangement of the first group, it is preferable to select the hereinabove-described configuration of the pole shoe whereby the magnetic flux between yoke 10 and the pole shoe is not interrupted in any rotary position. This can be understood when it is realized that if it were possible to interrupt the magnetic flux in any rotary position, there would result not only strong reaction forces upon the axis of rotation but there also would exist the possibility that the permanent magnet 7 which excites the magnetic circuit would lose part of its magnetic force. Pole shoe 5, legs 6 and magnet 7 correspond to like structures in the arrangement shown in FIGS. 1 and 2 correspondingly have been designated with the same respective numerals.

Figure 5:
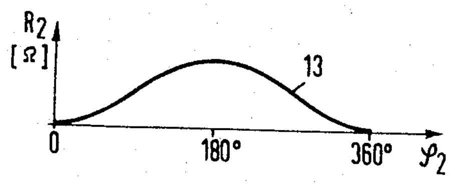
FIG. 5 is a graph illustrating the angle of rotation dependence of the resistance characteristic of the embodiment shown in FIG. 4.

FIG. 5 is a curve in which the abscissa is angle or rotation $\varphi_2$ and the ordinates are the resistance $R_2$ of field plate 11 expressed in ohms. The curve 13 indicates the sinusoidal characteristic of the resistance, $R_2$, which may be provided using the two-terminal field plate 11 in dependence upon the angle of rotation $\varphi_2$ of the slanted disc-shaped yoke 10 in a group one type rotary resistance arrangement. The higher the maxima in curve 13 of FIG. 5 and curve 9 of FIG. 3, the greater is the difference which may be produced between the strongest and the weakest magnetic fields in the respective regions of the field plates. In curve 3, the angular distance between the maximum and the minimum in curve 13 corresponds to a rotary angle of 180°.

The second group of contact-free rotary resistor arrangements constructed in accordance with the principles of the invention contemplates those in which one pole shoe encompasses the other pole shoe, and wherein both of these pole shoes lie in a single plane and are arranged to be rotatable toward each other about a common axis of rotation. One of these pole shoes which, effectively, functions as the yoke, is eccentrically disposed with respect to the axis of rotation and the other of the pole shoes is concentrically disposed with respect to such rotational axis and fixedly connected in the magnetic circuit. In addition, at least one galvanomagnetic semiconductor field plate is located in the air gap of and on the concentrically disposed and suitably circular pole shoe. The width of the air gap at its narrowest portion is suitably chosen to be approximately equal to the thickness of the field plate and arranged such that the pole shoes are prevented from physically contacting each other. A convenient term to use in describing the structure of the second group type rotary resistor is "eccentric pole face" which is intended to signify each pole face that is not circularly symmetrical with the axis of rotation of the rotary resistor.

The eccentric pole shoe, i.e., the yoke in the second group type rotary arrangement may be configured to be conic section-shaped, particularly circular or elliptical. If it is circular conic-section shape, then the central axis of the circular cone does not coincide with the axis of rotation. However, if it is, for example of elliptical conic-section shape, then the central axis of the elliptical cone may coincide with the axis of rotation upon the rotation about the axis of rotation of a circular eccentrically disposed pole shoe relative to the other stationary circular and concentrically disposed pole shoe and with a two terminal field plate provided on the stationary pole shoe. A sinusoidal relationship exists between the resistance of the galvanomagnetic semiconductor field plate and the angle of rotation.

In another embodiment of a contact-free rotary resistor arrangement of the second group, the eccentric pole shoe, i.e., the yoke extends along its periphery in a spiral coil configuration. The interdependence of the radius and rotational angle of the spiral may be determined by a linear, parabolic or exponential function, i.e., the radius of the spiral increases during rotation about the rotary axis from a minimum to a maximum value and then falls back substantially to the initial value.

The pole shoes in a rotary resistor arrangement of the second group are always located particularly close to each other at a peripheral point whereby the magnetic flux is strongest at such point. Beginning with the point of the narrowest air gap width between the pole shoes, the width of the air gap increases in its approximate annular circular shape. Consequently, in circular or elliptical eccentric pole shoes, the air gap progressively increases at both sides emerging from the point of the most narrow width. In the spiral-shaped eccentric pole shoe, the air gap extends from only one side of such most narrow point. These pole shoes and pole shoes having other configurations may suitably and simply be made by such techniques, for example, as stamping, milling, or spark grinding.

At least one galvanomagnetic semiconductor field plate is provided on the appropriate surface of the concentrically disposed circular pole shoe in rotary resistor arrangements of the second group. If more than one, i.e., two pole shoes are employed, they may suitably be disposed on the opposite diametric ends of the pole shoe. With this latter arrangement, the field plates are disposed in the magnetic flux radially with respect to the axis of rotation. Consequently, the rotary resistor arrangements of this second group may be designed to spatially have a relatively low height and to occupy relatively little volume.

As is readily appreciated from the foregoing, at least two embodiments are possible in rotary resistors of the second group constructed in accordance with the principles of the invention. In one of the first of these embodiments, the rotatable eccentric pole shoe, i.e., the yoke, may surround the circular concentrically disposed pole shoe in their mutual plane. In a second of these embodiments, the concentrically disposed pole shoe which is in fixed contact with the stationary structures of the magnetic circuit may surround the rotatable eccentric pole shoe in their mutual plane.

In the above-mentioned first embodiment of the second group rotary resistor arrangement, there may be used a magnet comprising a cup shaped structure containing a core therein. A cover may be provided on the cup which is adapted to be rotatable, the cover having an eccentric recess relative to the axis of the cup, i.e., the axis of rotation. This eccentric recess peripherally surrounds a magnetic disc disposed in the plane of the space of the recess, the latter disc being fixedly connected to the magnetic core. Suitably a permanent magnetic core, of the cup and core magnetic structure. Thereby, the outer edge of the recess provides the surface of one pole shoe while the surface opposed thereto of the other pole shoe is the peripheral edge of the circular disc. The latter surface carrying at least one field plate. The core of the cup and core magnet arrangement is magnetized in the axial direction.

In the second embodiment of the rotary arrangement of the second group, i.e., where the fixed concentrically disposed circular pole shoe surrounds the rotatable eccentric pole shoe, the magnetic circuit may comprise a cup and core magnet with a cup cover comprising a soft magnetic material tightly applied thereto. With such arrangement, the cover has provided therein, a circular recess concentrically disposed relative to the axis of the cup, i.e., the axis of rotation. This recess surrounds the soft magnetic material disc which is eccentrically disposed relative to the axis of rotation and which lies coplanarly with the recess. The eccentric, soft magnetic material disc lies on the permanent magnet core of the cup and core magnet and is rotatable relative thereto about the axis of the cup, i.e., the axis of rotation. The edge of the recess defined by the inner peripheral edge of the fixed circular concentrically disposed pole shoe provides one pole shoe surface and the outer peripheral edge of the rotatable eccentrically disposed disc provides the other pole shoe surface. The fixed pole shoe surface carries at least one field plate.

The strong magnetic field forces which, particularly in the rotary resistor arrangements of the second group, act upon the yoke or the rotatable eccentric pole shoe can be mounted in ball bearings. Thus, in the second group, if the eccentric pole shoe is surrounded by the fixed circular pole shoe, as in the second embodiment, then a ball bearing may suitably be disposed in a cylindrical, substantially hollow recess of the cup and core magnet. An axially disposed rotation rod, suitably comprising a non-magnetic material may be received in this ball bearing. The rod may also be received in an additional and non-magnetic ball-bearing which is located, as seen from the magnetic core, on the other side of the yoke.

In the case of the first embodiment, i.e., where the rotatable eccentric pole shoe or yoke is disposed to encircle the fixed, concentrically disposed pole shoe, then the acting magnetic forces can be captured by a ball-bearing which peripherally surrounds the eccentric pole shoe at its substantially circular outer wall. Since, in this latter arrangement, the eccentric rotatable pole shoe is supported along its entire circular outer periphery, only a relatively small bearing pressure occurs and, consequently, the eccentric pole shoe is easily rotatable.

Figure 6:
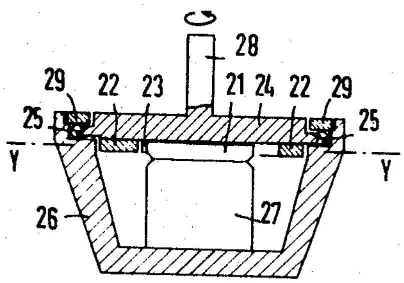
FIG. 6 is a depiction, partly in section, of an illustrative embodiment of a rotary resistor arrangement of a second group type constructed in accordance with the principles of the invention, in which an eccentric pole shoe surrounds a concentric pole shoe.

Referring now to FIG. 6 wherein there is shown a vertical, partly cross-sectional view of an example of a first embodiment of the second group of rotary resistor arrangements according to the invention, this arrangement is rotatable about an axis of rotation along which a rod 28 of non-magnetic material is disposed. In the arrangement, there is provided a permanent cup and core magnet comprising a cup-like structure 26 having centrally disposed therein a core 27. A circular concentrically disposed disc pole shoe 21 is tightly affixed to core 27, a field plate 23 being located on the periphery of disc 21. The structure designated with the numeral 24 is the cup cover, cover 24 carrying on its undersurface the eccentric rotatable outer pole shoe 22 fixedly attached thereto. Cover 24 may suitably comprise a non-magnetic material such as brass or "Plexiglas," for example. The space defined by the inner periphery of pole shoe 22 and the outer periphery of pole shoe 21 is the air gap between the pole shoes. The outer periphery of cover 24 may be received in a ball bearing 25 located at the upper inner edge of cup 26 and may be affixed thereto by means of an attachment ring 29. Cover 24 is adapted to be rotatable about axis 28. Suitably, pole shoes 21 and 22, cover 24, and cup 26 may all comprise a soft, i.e., high permeability magnetic material although, as has been stated hereinabove, cover 24 may also comprise a non-magnetic material.

Figure 7:
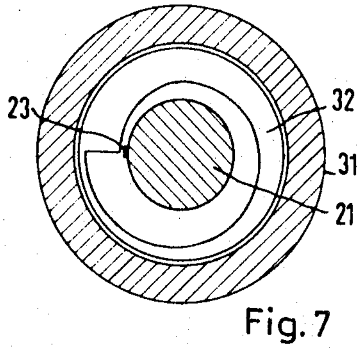
FIG. 7 is a section taken along lines Y—Y of FIG. 6 and illustrates a spiral-shaped eccentric pole shoe.
Figure 8:
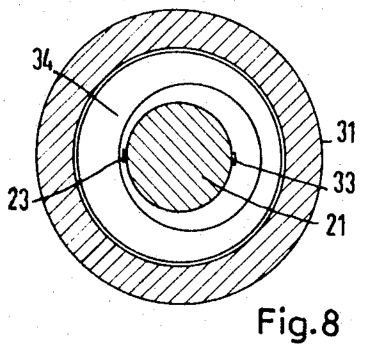
FIG. 8 is a section taken along lines Y—Y of FIG. 6 and illustrates a circular eccentric pole shoe.

FIGS. 7 and 8 are sections taken along the lines Y—Y of FIG. 6 and, in which, there are respectively represented two suitable eccentric pole shoe configurations.

In FIG. 7 the eccentric pole shoe 32 is of a spiral shape. The numeral 31 designates the outer periphery of the arrangement, and structure 21 is the inner disc cocentrically disposed fixed circular pole shoe, field plate 23 being carried on pole shoe 21. Upon the rotation of pole shoe 32, the narrowest width point of the air gap defined by the outer periphery of pole shoe 21 and the inner periphery of pole shoe 32 is moved around pole shoe 21. Consequently, the magnetic field, which lies parallel to the plane of the drawing is essentially radially directed with respect to axis 28.

In FIG. 8, in addition to field plate 23 on inner fixed circular pole shoe 21, there is further included a field plate 33 on pole shoe 21 in diametrically opposed disposition to field plate 21. Outer eccentric rotatable pole shoe 34 is differently configured as compared to pole shoe 32 in FIG. 7.

Figure 9:
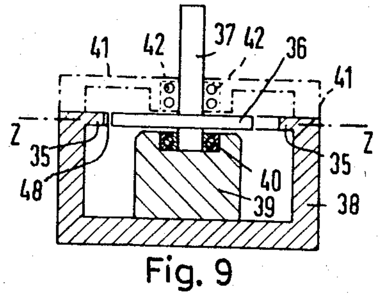
FIG. 9 is a depiction, partly in section, of another embodiment of a rotary resistor arrangement of the second group type according to the invention in which the concentric pole shoe surrounds the eccentric pole shoe.

FIG. 9 shows an example of the second embodiment of the second group of rotary resistor arrangements. In this example, the exciting magnet comprises a cup 38 having a centrally axially disposed permanent magnet core 39 therein. The axially disposed rod 37 is received in a ball bearing 40 located in a cylindrical recess provided therefor at the upper end of core 39. The eccentric rotatable pole shoe 36 in the arrangement of FIG. 9 is the inner structure and is mounted on rod 37 to be rotatable therewith. The other and fixed circular concentrically disposed pole shoe 35 may extend inwardly from the upper inner edge of cup 38 as a circular tab and may suitably be integral with cup 38. At least one galvanomagnetic semiconductor field plate is provided on the periphery of pole shoe 35 in the air gap defined by the peripheries of pole shoes 35 and 36. Axial member 37 of eccentric pole shoe 36 is stably maintained in its perpendicular position by ball bearing 40, member 37 preferably comprising a non-magnetic material. In addition to or instead of providing ball bearing 40, member 37 may be stably maintained in its proper position by a bearing 42 which is provided in a concentrically located portion of a cup cover 41, cover 41 preferably comprising a non-magnetic material. Cover 41 may suitably also be affixed to axial member 37 and be rotatable in a ball bearing located at its periphery. Since structures 41 and 42 are of an alternative nature, they have been depicted in FIG. 9 by means of broken lines.

Figure 10:
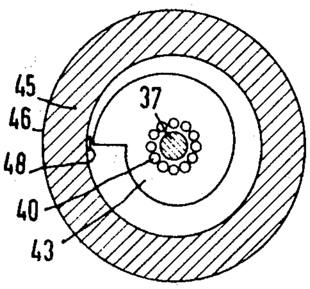
FIG. 10 is a section taken along lines Z—Z of FIG. 9 in which there is illustrated an eccentric pole shoe with a spiral periphery.
Figure 11:
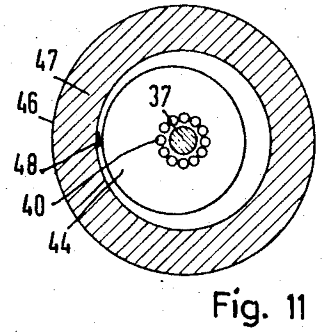
FIG. 11 is a section taken along lines Z—Z of FIG. 9 and illustrates a circular eccentric pole shoe.

FIGS. 10 and 11 are views taken along lines Z—Z of FIG. 9 but respectively show differently configured eccentric pole shoes. In both of these figures, the numeral 46 designates the outer periphery of the arrangement, the numeral 48 designates the field plate and the numeral 40 designates the ball bearing in which axial number 37 is received. In FIG. 10, the numeral 43 designates the eccentric rotatable pole shoe, and the numeral 45 designates the outer fixed, concentrically disposed circular pole shoe. In FIG. 11, the numerals 44 and 47 respectively designate the eccentric and circular pole shoes respectively.

Since in the inventive rotary resistor arrangements of both of the above-described groups, the gavanomagnetic semiconductor field plates are supported by strong, massive structures which have good heat conductivity, these field plates may be subjected to relatively strong electric forces. There is, therefore, enabled the utilization in these arrangements of quite small field plates with appropriately high ground or base resistance values (by ground resistance is meant the resistance of a field plate where the magnetic field is zero). Thus, in the embodiments according to the invention, field plates are used which have areas as small as a few square millimeters.

The hereinabove described rotary resistor arrangements of both groups may, among their many possible applications, be used as respective individual elements of a cascade resistor combination with two or more individual elements arranged adjacent to each other on a common axis of rotation. In such cascade arrangement, the respective pole shoes of all of the individual elements can be magnetically excited by a single magnet. The individual elements comprising this type of cascade resistor arrangement are readily exchangeable and can be replaced, as desired, either in part, or completely with individual elements having different resistance characteristics.

In one embodiment of a cascade resistor combination, the yokes, i.e., the rotatable magnetic structures in each of the first and second groups are connected to each other, and are made to be continuously rotatable as long as it is so desired. Consequently, the electrical signal function which depends upon and varies with the resistance change of the field plates, which in turn depends upon the angle of rotation is periodically repeated if the field plates are connected in a suitable electrical circuit. In this type of rotary resistor combination, the resistances of the individual elements are in additive relationship. Such addition may be effected in the same phase or may be achieved with a constant phase shift, depending upon the mutual rotary positions of the yokes with the use of the cascade combination which comprises individual rotary resistor elements having various different resistance characteristics respectively, any desired linear and non-linear functions may be combined in the above mentioned phase relationships.

In another embodiment of the cascade combination, the individual yokes of the individual rotary resistor elements respectively are so coupled to each other on their common axis of rotation whereby these yokes are successively plated in motion and whereby a yoke's motion commences only upon the halting of the motion of the immediately preceding yoke. In addition, the ground resistances (resistances in zero magnetic fields) of the field plates of the successively motion-activated individual elements may be chosen to differ from each other by a predetermined, preferably equal factor, such that, upon the rotation of a yoke of an individual element, the electrical resistance of the field plate therein increases to the base resistance values of the field plate of the next succeeding individual element.

If the field plates of the individual rotary resistor elements of the cascade combination are all connected in series, then the resulting series-connected rotary resistors enable, through several rotations thereof, the providing of a contact-free resistance change over a plurality of magnitudes. If the series combination of the field plates is provided with a center tap, then a potentiometer with a parts ratio of 1:1000 or 1:10,000 is readily obtained.

If the cascade combination comprises rotary resistors of the hereinabove described first group, then the spatially stationary portion of the magnetic circuit of the combination contains each of the fixed pole shoes of the individual elements, suitably semicylindrical and bridge-shaped pole shoes respectively. Thereby, adjacent individual elements may be shifted 180° with respect to each other in order to balance the magnetic forces acting upon the axis of rotation. A field plate is provided on the bridge-shaped pole shoes of each individual element respectively.

Where the cascade combination comprises rotary resistor elements of the aforesaid second group, then each individual element comprises a pole shoe which is eccentric with respect to the axis of rotation and of a circular pole shoe surrounding the eccentric pole shoe and which is concentrically disposed relative to the axis of rotation. The eccentric pole shoes, i.e., the yokes of the second group type rotary resistor elements, are rotatable about the rotational axis. The concentric pole shoes are affixed to the magnetic circuit excitation structures and at least one field plate is located on a circular pole shoe in the air gap defined by the circular and eccentric pole shoes.

FIGS. 12 and 13 schematically depict arrangements in which both the first and second groups of rotary resistor arrangements according to the invention may be used as individual elements in cascade resistor combinations.

FIG. 12 shows an embodiment of a cascade resistor combination comprising four individual rotary resistor elements of the first groups. In this embodiment, the four soft magnetic material yokes 51 to 54 respectively are disposed to be rotatable about a mutual axis of rotation conceptually depicted by the broken line bearing the designating numeral 50. Yokes 51 to 54 each have the configuration of a slanted disc which are disposed of a slant with respect to axis 50. Each of yokes 51 to 54 are disposed in the air gap defined by a pair of fixed pole shoes, one of these pole shoes being of bridge-shaped configuration, the other of these pole shoes being of semicylindrical configuration, the pole shoes corresponding to pole shoes 4 and 5 respectively in the arrangement shown in FIG. 1. Thus, yoke 51 is located in the air gap defined by semicylindrical pole shoe 59 and field plate carrying bridge-shaped pole shoe 55; yoke 52 is located in the gap defined by semicylindrical pole shoe 60 and field plate carrying bridge-shaped pole shoe 56; yoke 53 is disposed in the gap defined by semicylindrical pole shoe 61 and field plate carrying bridge-shaped pole shoe 57; and yoke 54 is disposed in the gap defined by semicylindrical pole shoe 62 and field plate carrying bridge-shaped pole shoe 58. The field plates on the respective bridge-shaped pole shoes bear the designating numerals 65, 66, 67, and 68 as shown. Each of the pole shoes are magnetically excited by a common permanent magnet 63 which is suitably magnetized in the direction depicted by the designating arrow, structures 64 being the legs of the magnet. The pole shoes, similar to the yokes, suitably comprise a soft magnetic material. The field plates 65 to 68 respectively in the arrangement of FIG. 12 may be of the two or three terminal type. It is noted that in the upper and lower arrays of pole shoes in the arrangement of FIG. 12 that the semicylindrical pole shoes are interleaved with the bridge-shaped pole shoes. Such arrangement effects a 180° displacement between adjacent individual rotary resistor elements and enables the balancing of the magnetic forces acting upon their common axis of rotation 50.

Yokes 51 to 54 may be fixedly connected to each other to be rotatable in unison. Alternatively, they may be so coupled whereby they are individually rotatable and may be arranged such that upon rotation of an axially disposed member on which the yokes are mounted (not shown) on the axis of rotation, they are successively placed into motion. Thereby, a follower device may be used, whereby an immediately succeeding yoke is set into motion when the immediately preceding yoke is brought to a halt. In such arrangement, each yoke may be caused to make a complete revolution about the common axis of rotation when several successively occurring rotations are performed. It is, of course, to be realized that the yokes in the arrangement shown in FIG. 12, may also have a worm shape as does the yoke in the arrangement of FIG. 1.

In FIG. 13, there is depicted a cascade resistor combination comprising a plurality of individual rotary resistor arrangements of the second group. In this embodiment, the eccentric soft magnetic material pole shoes 71, 72, 73 and 74 which are the yokes and are rotatable about a common axis of rotation are mounted on the rotatable axially disposed member 70. Yokes 71 to 74 are surrounded by the concentrically disposed fixed pole shoes 75, 76, 77 and 78 respectively. Each of pole shoes 75 to 78 carry in the respective air gaps defined between them and eccentric pole shoes 71 to 74, field plates 79, 80, 81, and 82. Each of pole shoes 72, 73, and 74 lie on soft magnetic material rings 72*a*, 73*a*, and 74*a* respectively which function as spacers between pole shoes 71 to 74 respectively. The spacing functions of the spaces are necessary to insure that the respective magnetic fields in the air gaps of each individual rotary resistor arrangements do not influence each other. The magnetic exciting comprises a cup 87 having a core 83 disposed therein similar to the cup and core magnet depicted in FIGS. 6 and 9, rings 72*a*, 73*a*, and 74*a* suitably having a diameter substantially equal to the diameter of core 83. Axial member 70 is received in a ball bearing 84 which is located in a hollow cylindrical recess provided therefor in core 83. Axial member 70 is also supported by a ball bearing 85 which is received in concentrically disposed opening in a nonmagnetic material cup 87 cover 86. The eccentric pole shoes may be arranged to be either individually rotatable (as shown in FIG. 13 by the space arrangement in axial member 70), or may be fixedly connected to be rotatable in unison.

In a modification of the cascade combination of individual rotary resistor elements of the second group, the eccentric rotatable pole shoes may be chosen to be the outer pole shoes, relative to the axis of rotation and the concentrically disposed circular poles shoes may be chosen to be the inner pole shoes.

The above-described individual rotary resistor arrangements according to the invention, both of the first and second groups, may be used as position indicators for a Cardanic suspension. In such indicators, any individual rotary resistor element is positioned at least at one of the Cardan bearings.

If, in this latter connection, a rotary resistor arrangement of the first group is employed, then, for example, the spatially stationary portion of its magnetic circuit may be fixedly connected to the Cardan ring and the rotatable magnetic yoke may be fixedly connected to the Cardan axis to be rotatable therearound. Suitably, a two- or three-terminal field plate may be located, preferably, on the bridge-shaped pole shoe of this type of position indicator. If the field plate is chosen to be of the three terminal type, i.e., two end terminals and a center tap, it may be preferable to adjust the yoke in the initial position of the Cardan ring whereby both halves of the surface of the field plate are traversed by equally strong magnetic fields. Then, the partial resistances of both field plate halves are equal and the null instrument constituting the potentiometer formed with the three-terminal field plate exhibits a zero value.

The foregoing type of indicator serves essentially to indicate oscillations about the aforementioned zero value. If the yoke of the first type rotary resistor arrangement used as the position indicator is chosen to be of the worm-shaped type, then, suitably a worm is provided having a quite steep ascent along its spiral path. If alternatively, such yoke is chosen to be of the slanted disc type, then the latter is advantageously disposed so as to make the smallest possible angle with the axis of rotation, such as 45°. In this situation, the field plates should be chosen to be relatively long and narrow, and the disc should be chosen to have an appropriate thickness.

If rotary resistors of the second group are employed for the position indicator, then the eccentric rotatable pole shoe, i.e., the yoke may, for example, be fixedly connected to the Cardan ring. The rotary bearing of this pole shoe then, simultaneously, serves as a Cardan bearing. The spatially stationary portion of the magnetic circuit which includes the circular concentrically disposed pole shoe is, in this situation, fixedly attached at the Cardan axis and is arranged symmetrically with respect to the Cardan axis.

Either a two or three terminal field plate may be provided on one of the pole shoes of this type of position indicator when second group type rotary resistor arrangements are employed. If the field plate is chosen to be of the center-tapped three terminal type, it may be preferable to adjust the eccentric pole shoe in the initial position of the Cardanic suspension such that both halves of the field plate are traversed by equally strong magnetic fields respectively. Then, the respective partial resistances of both field plate halves are also equal and a null instrument constituted by the potentiometer formed by the field plate exhibits a zero value.

As an example of the use of the foregoing position indicators, they are advantageously employed in a Cardanically suspended stabilizing gyro which operates to provide an artificial horizon.

FIGS. 14 to 17 are schematic depictors of position indicators for Cardanic suspensions, which employ rotary resistor arrangements according to the invention.

FIGS. 14 and 15 show an embodiment of a position indicator for a Cardanic suspension utilizing first group rotary resistor arrangements. In these figures, two Cardan rings 95 and 98 are coplanarly disposed, a first group rotary resistor arrangement 90 being provided at each of the Cardanic axes 91, 92, 93 and 94 respectively. Between the soft magnetic material pole shoes 96, 97, 98 and 99 of the approximately U-shaped permanent magnetic structures 100 and 101 which are fixedly in magnetic circuit with the Cardan rings, there are disposed magnetic yokes 104 and 105 which are fixedly connected to axial bearings 102 and 103. Yokes 104 and 105 when viewed along the axial direction present a circular cross section and may be either worm-shaped or discs disposed at a slant relative to the axis. Yokes 104 and 105 are precisely disposed in the respective spaces defined by pole shoes 96 and 98, and 97 and 99 and have dimensions whereby they leave a minimum clearance gap in these spaces to enable their free rotation. Field plates 106 and 107 are respectively located on bridge-shape pole shoes 96 and 97 and may be two- or three-terminal as desired. Pole shoes 98 and 99 are suitably chosen to be of semicyclindrical configuration. If field plates are also provided on pole shoes 98 and 99, then suitably they may also be configured to be bridge-shaped.

Figure 16:
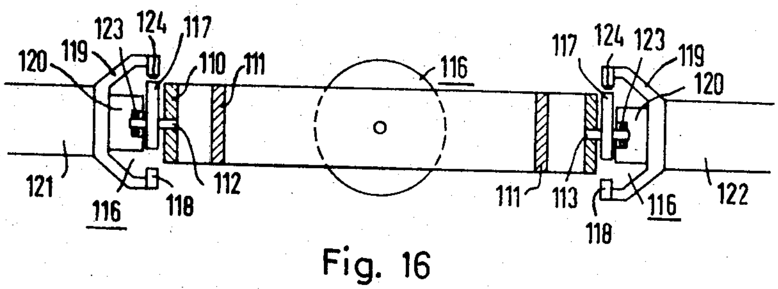
FIG. 16 is a side view, partly in section, of a position indicator comprising second group type rotary resistor arrangements, for a cardanic suspension.
Figure 17:
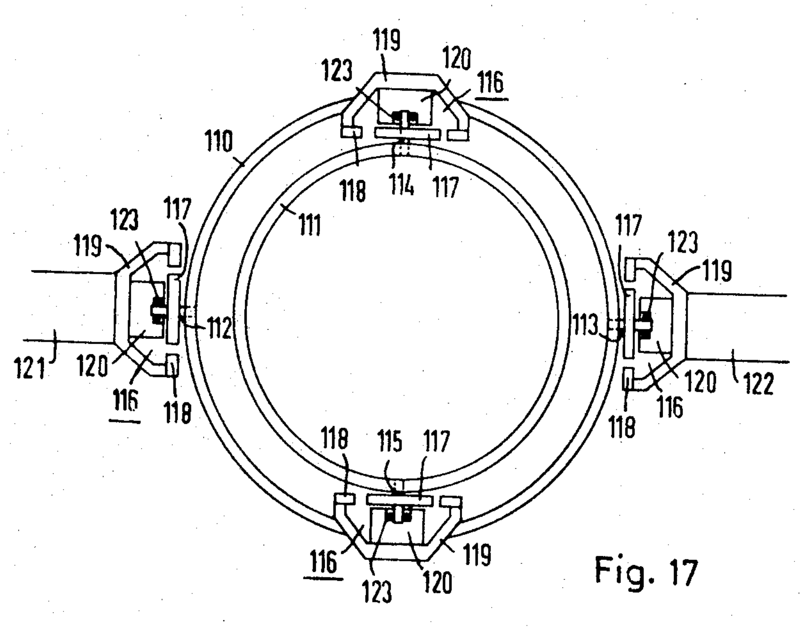
FIG. 17 is a plan view of the position indicator shown in FIG. 16.

FIGS. 16 and 17 are respectively side and plan views of an embodiment of a position indicator comprising second group type rotary resistor arrangements. In these figures, there are shown two Cardan rings 110 and 111 which are coplanarly disposed. A rotary resistor arrangement 116 of the second group type such as is shown in FIG. 9 is provided at each Cardan axis 112, 113, 114 and 115 of rings 110 and 111. With this arrangement, the eccentric pole shoes 117 are surrounded in their common plane by concentrically disposed circular pole shoes 118.

The cup and core magnet comprising the cup 119 and the permanent magnetic material core 120 is affixed to the abutments 121 and 122 respectively of Cardan ring 110. The axially disposed members 112, 113, 114 and 115 are received in ball bearings 123 which are respectively disposed in cylindrical recesses provided therefor in cups 120 of the cup and core magnets. The respective eccentric pole shoes, i.e., the yokes are all fixedly mounted on axial members 112 and 115 respectively. Each of the respective air gaps defined by pole shoes 117 and 118 have disposed therein a field plate 124 located on the outer concentrically disposed circular pole shoes 118, the field plates not being visible in FIG. 17.

In the aforedescribed position indicators comprising rotary resistor arrangements of either the first or second groups, measuring signals which are generated at the two rotary resistor arrangements, i.e., position indicators associated with a Cardan ring, may be fed to a single indicating device. However, it is also possible to calibrate the rotary resistors associated with a Cardan ring with predetermined sensitivities, for example, by differently shaped yokes, and to feed the obtained signals to two separate indicating devices with such arrangement, there is enabled the measuring of the position of the Cardan ring with varying degrees of precision.

The semiconductor field plates which are used in the rotary resistor arrangements according to the invention suitably should have a strong galvanomagnetic resistance. Suitable semiconductor materials may be the known $A^{III}B^{V}$ materials such as indium antimonide or indium arsenide, $A^{III}$ being an element from group III of the periodic table of elements and $B^{V}$ being an element from group V of the periodic table of elements. A particularly high galvanomagnetic dependence is obtained if needle-shaped anistropic inclusions of a relatively good conductivity material are imbedded in the semiconductor material, these inclusions suitably being in parallel spaced disposition and being aligned substantially perpendicularly to the current path through the field plate. Examples of an anisotropic inclusion material may be, for example, a conductive metal or nickel-antimonide in indium antimonide.

It will be obvious to those skilled in the art upon studying this disclosure, that contact-free rotary resistor arrangements according to our invention permit of a great variety of modifications and hence can be given embodiments other than those particularly illustrated and described herein without departing from the essential features of our invention and within the scope of the claims annexed hereto.

We claim:

1. Contact-free rotary resistor arrangement comprising a magnetic circuit including a stationary magnetically excited structure, and a disc-shaped magnetic structure disposed adjacent and peripherally spaced from said stationary structure so as to define an air gap therebetween, said disc-shaped structure having a rotary axis and at least one end face thereof slanted with respect to said axis, said stationary magnetically excited structure and said rotary disc-shaped structure having peripheral surfaces at least partly opposing one another, said air gap being traversible by the peripheral surface of said disc-shaped structure during each cycle of rotation of said disc-shaped structure about said axis so as to produce a varying magnetic field in said air gap, at least one galvanomagnetic semiconductor field plate disposed on one of said opposing peripheral surfaces so as to be subjected to the varying magnetic field in said air gap during said rotation cycle, and means for connecting said field plate in an electrical circuit.

2. Contact-free rotary resistor arrangement according to claim 1 wherein said stationary magnetically excited structure comprises a pair of pole shoes, and said field plate is located on one of said pole shoes.

3. A contact-free rotary resistor arrangement as defined in claim 1 wherein said structures comprising said magnetic circuit comprise a material selected from the group consisting of soft magnetic material and ferrite.

4. Contact-free rotary resistor arrangement comprising a magnetic circuit including a pair of magnetically excited stationary pole shoes of magnetic material disposed in opposite spaced relationship and defining an air gap therebetween, at least one semiconductor field plate located on one of said pole shoes within said air gap, a yoke mounted within said air gap and having a rotary axis disposed perpendicularly to the lines of force of said magnetic circuit, said yoke having at least one end face located at an inclined angle with respect to said axis, said pole shoes and said yoke having peripheral surfaces at least partly opposing one another, said air gap adjacent said field plate being traversible by the peripheral surface of said yoke during each cycle of rotation of said yoke about said axis so as to produce a varying magnetic field in said air gap and consequently in said field plate, and means for connecting said field plate at the ends thereof in an electrical circuit whereby current induced in said field plate travels in a path substantially along the length of said field plate, said field plate, when connected in said electrical circuit, having a resistance characteristic varying in accordance with the angle of rotation of said yoke.

5. A contact-free rotary resistor as defined in claim 4 wherein the opposing face of one of said pole shoes is of longitudinal semi-cylindrical configuration and wherein said other pole shoe has a substantially trapezoidal configuration, in cross-section, the smaller surface of said other pole shoe being in opposed spaced relationship with said opposing face of said one pole shoe, said field plate being disposed along the smaller and apical surface of said other pole shoe, said sides of said other pole shoe being concave in said cross-section.

6. A contact-free rotary resistor arrangement as defined in claim 4 wherein the length of said field plate is equal to about one-half the length of said smaller surface and is disposed on a one-half end portion of said smaller surface and wherein said yoke is a slanted disc having a thickness about equal to said one-half length, the slant angle of said disc with respect to said axis of rotation being so chosen whereby in a given cycle of rotation of said yoke, said outer periphery of said yoke progressively traverses the length of said field plate from a minimal length to its total length during one-half cycle and from its total length back to said minimal length during the other half cycle.

7. A contact-free rotary resistor arrangement as defined in claim 5 wherein said field plate connecting means comprise a terminal on each end thereof with respect to its longitudinal dimention to adapt it for connection into an electrical circuit to provide a current flow direction through said field plate substantially perpendicular to the lines of force of said magnetic circuit.

8. A contact-free rotary resistor arrangement as defined in claim 7 wherein said field plate further includes a center tap terminal for adapting the connecting of said field plate into said electrical circuit as a potentiometer.

References Cited

UNITED STATES PATENTS

| | | | |
|---|---|---|---|
| 2,536,805 | 1/1951 | Hansen | 310—10 |
| 2,924,633 | 2/1960 | Sichling et al. | 338—32 |
| 3,018,395 | 1/1962 | Carlstein | 338—32 |
| 3,112,464 | 11/1963 | Ratajski et al. | 338—32 |
| 3,152,261 | 10/1964 | Carlstein | 324—45 |
| 3,162,804 | 12/1964 | Parsons | 338—32 |
| 3,162,805 | 12/1964 | Robertson | 338—32 |
| 3,194,990 | 7/1965 | Kendall | 338—32 |

RICHARD M. WOOD, *Primary Examiner.*

W. D. BROOKS, *Assistant Examiner.*